Jan. 1, 1946.  S. H. NORTON  2,392,175
PROCESS OF MAKING HOLLOW VALVES
Filed March 11, 1942  4 Sheets-Sheet 1
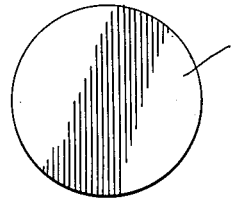
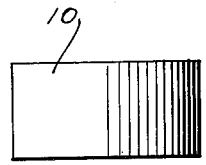
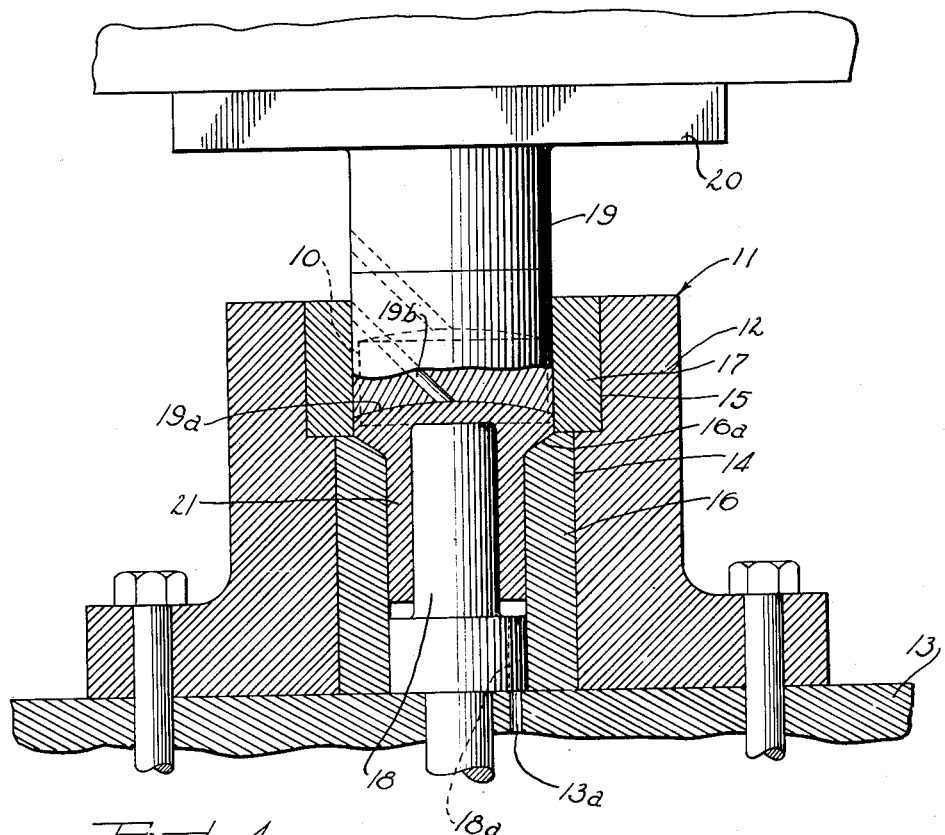
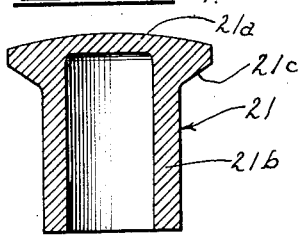
Inventor
SAMUEL H. NORTON

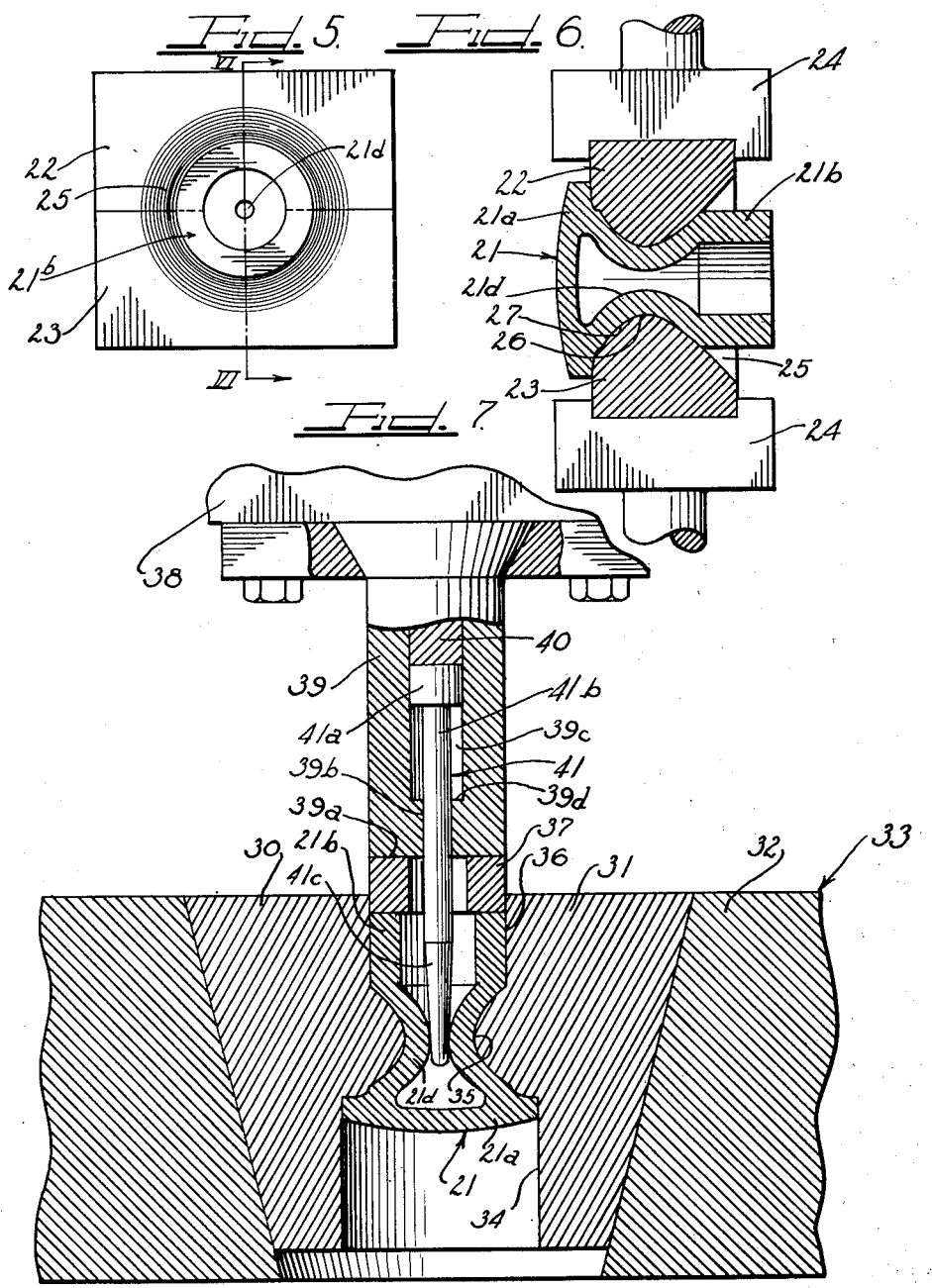

Jan. 1, 1946.   S. H. NORTON   2,392,175
PROCESS OF MAKING HOLLOW VALVES
Filed March 11, 1942   4 Sheets-Sheet 3
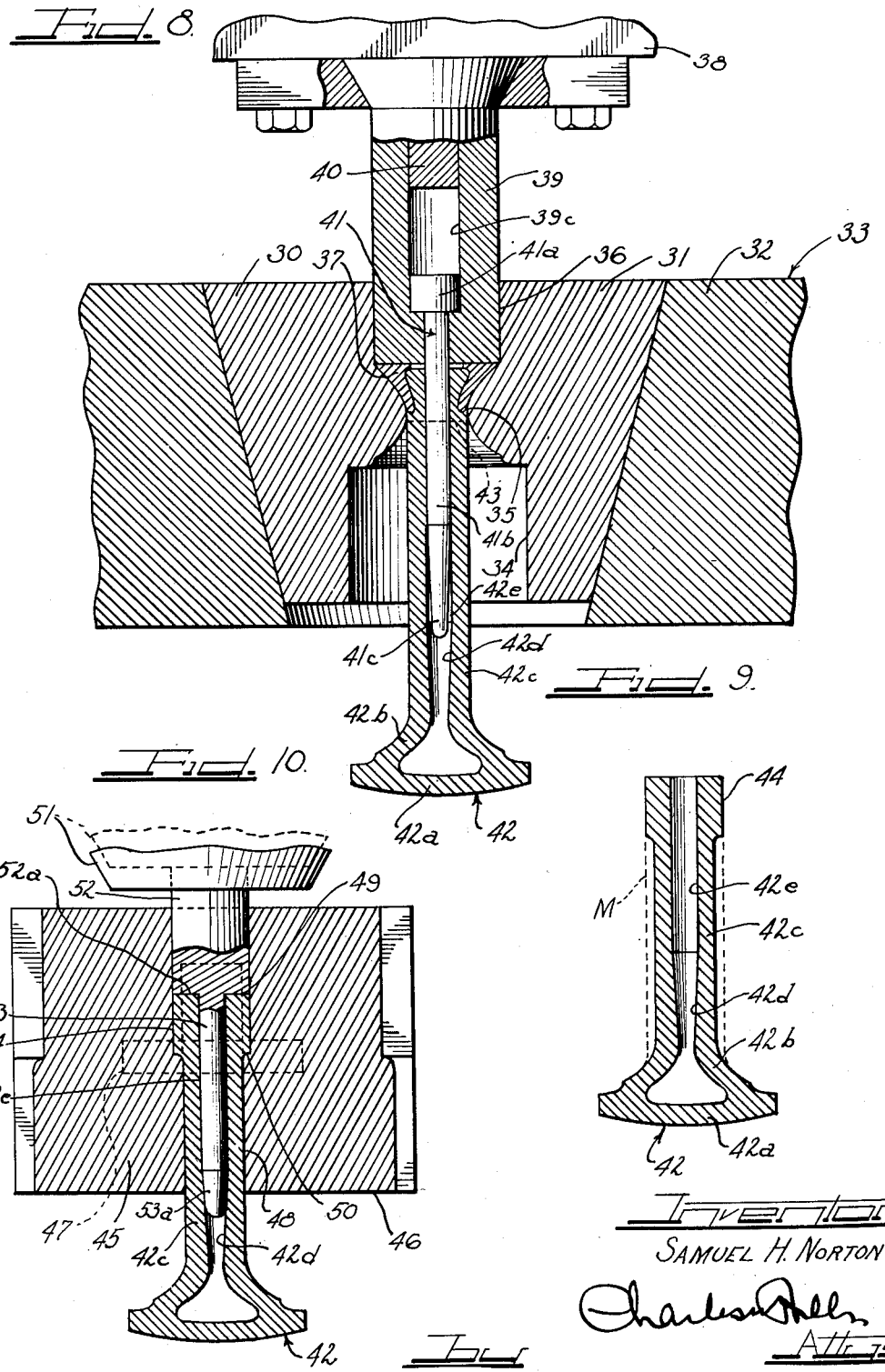

Jan. 1, 1946.  S. H. NORTON  2,392,175
PROCESS OF MAKING HOLLOW VALVES
Filed March 11, 1942  4 Sheets-Sheet 4
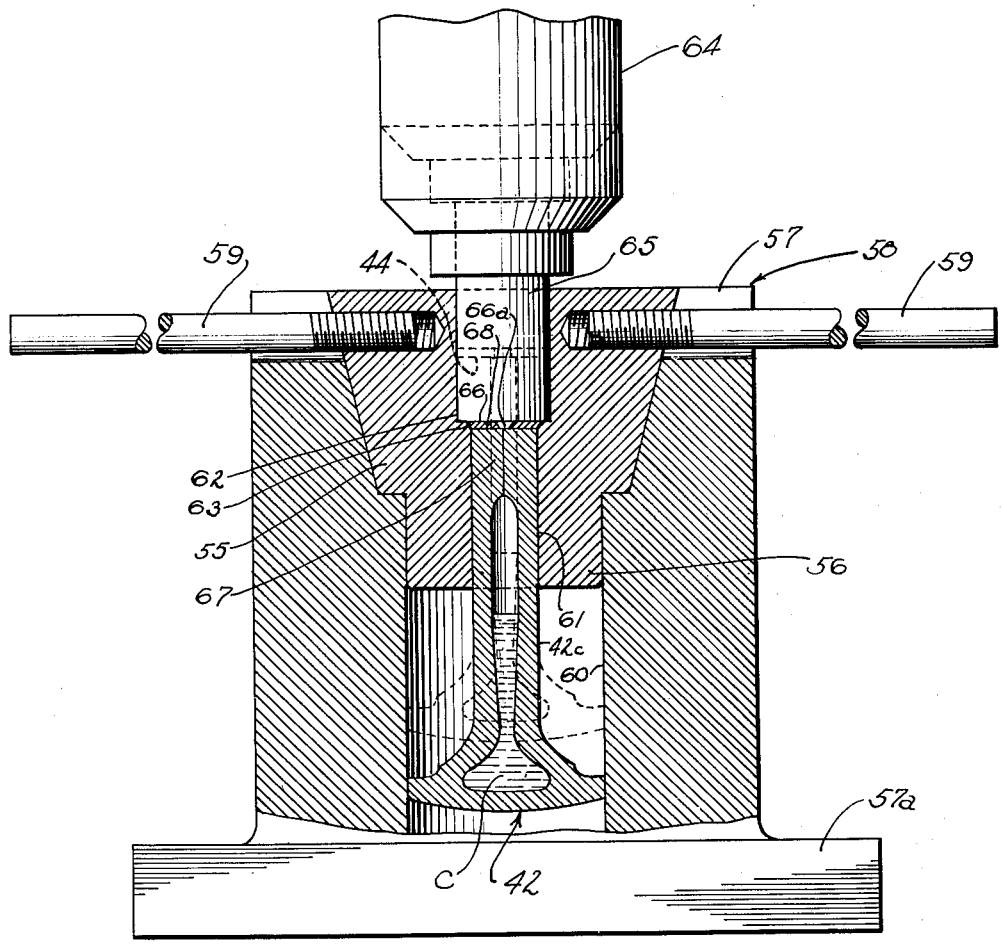
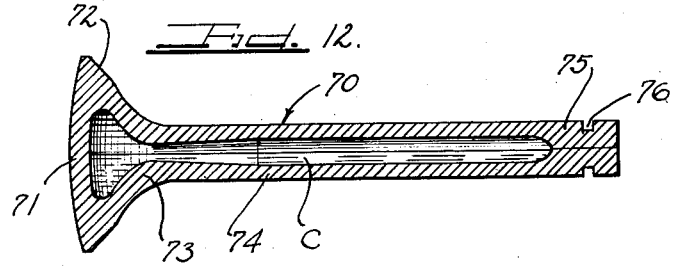
Inventor
SAMUEL H. NORTON
By Charles... Atty.

Patented Jan. 1, 1946

2,392,175

UNITED STATES PATENT OFFICE 2,392,175

PROCESS OF MAKING HOLLOW VALVES

Samuel H. Norton, Cleveland, Ohio, assignor to Thompson Products, Inc., a corporation of Ohio Application March 11, 1942, Serial No. 434,238

2 Claims. (Cl. 207—10)

This invention relates to the production of hollow headed articles such as poppet valves.

More specifically the invention relates to a process and an apparatus for making hollow stemmed poppet valves.

According to this invention a solid metal billet is extruded into headed cup shaped form around a stake. The headed cup shaped blank is then necked down or inwardly bowed adjacent the headed end thereof for producing a restricted intermediate throat portion in the blank. The necked down blank is next extruded around a pin to form a hollow stem portion depending from the head. Since it is desirable to provide, in poppet valves, a thickened throat portion between the head and stem, in accordance with a preferred embodiment of this invention, the extrusion of the necked down blank is carried out around a floating pin having a tapered end. The tapered end of the floating pin is seated in the necked down portion of the blank and can travel at the same rate of speed as the extruded blank metal so that the stem portion adjacent the head will have a tapered hole exactly conforming with the tapered end of the pin. Upon completion of that portion of the extruding operation which forms the tapered hole, the pin moves at a slower rate than the extruded metal during the remaining portion of the extruding operation so that the pin is gradually retracted toward the open end of the blank. This second stage of the extrusion process produces a true cylindrical hole in the stem conforming exactly with the cylindrical portion of the pin. This cylindrical hole is axially aligned with the tapered hole.

Upon completion of the extrusion operation the resulting valve body has a nubbin formed on the end of the stem. The cavity in the body can then be partially filled with a coolant such as sodium and the nubbin end is inwardly collapsed in another extrusion die to close the stem end and thereby seal the coolant in the valve.

This invention eliminates heretofore considered necessary forging, extruding, drilling and machining operations.

If desired, and in accordance with this invention, the headed cup shaped blank can be produced by casting or forging instead of by extrusion around a stake.

It is, then, an object of this invention to provide a process of making hollow stemmed headed articles without collapsing the stem producing metal of the article.

Another object of this invention is to produce hollow headed articles from cup shaped metal blanks by extrusion around an inserted mandrel.

A still further object of the invention is to provide hollow poppet valves in a minimum number of steps.

Another object of the invention is to provide hollow poppet valves with tapered hole portions in the stems thereof by extruding valve blanks around tapered pins adapted to move at the same rate as the extruded metal during a portion of the extruding operation and adapted to move at a slower rate than the extruded metal during the remaining portion of the extruding operation.

Another object of the invention is to provide apparatus for producing tapered holes in hollow articles such as poppet valves.

A still further object of the invention is to provide a hollow stemmed poppet valve having a tapered hole portion and a straight cylindrical hole portion in the stem thereof which portions are the exact counterparts of a cylindrical pin having a tapered end.

Other and further objects of the invention will become apparent to those skilled in the art from the following detailed description of the annexed sheets of drawings which, by way of preferred example, illustrate one embodiment of the invention.

On the drawings:

Figure 1 is a plan view of a solid metal billet from which hollow poppet valves can be made in accordance with this invention.

Figure 2 is a side elevational view of the billet shown in Figure 1.

Figure 3 is a vertical section, with parts in elevation, of a punch press for forming a headed cup shaped blank from the billet of Figures 1 and 2.

Figure 4 is a vertical cross-sectional view of a headed cup shaped blank produced by the punch press of Figure 3.

Figure 5 is a plan view of a pair of Bradley hammer dies for necking down the blank of Figure 4.

Figure 6 is a vertical cross-sectional view taken along the line VI—VI of Figure 5.

Figure 7 is a vertical cross-sectional view, with parts in elevation, of an extruding punch press illustrating the start of an extruding operation on the necked down blank of Figure 6.

Figure 8 is a view similar to Figure 7 illustrating the completion of the extruding operation.

Figure 9 is a vertical cross-sectional view of an extruded valve body made in the punch press of Figures 7 and 8 and illustrating, in dotted lines, one manner in which a nubbin can be formed on the end of the valve stem.

Figure 10 is a vertical cross-sectional view, with parts in elevation, of a punch press for upsetting a nubbin end on the stem of the valve body shown in Figure 8.

Figure 11 is a vertical cross-sectional view, with parts in elevation, of a punch press for collapsing the nubbin formed on the end of the valve stem to seal the valve.

Figure 12 is a vertical cross-sectional view of a completed valve prepared in accordance with this invention.

As shown on the drawings:

In Figures 1 and 2 the reference numeral 10 designates generally a solid cylindrical billet or slug from which valves of this invention can be made. As shown in Figure 3 a punch press 11 is used to extrude the billet 10 into a headed cup shaped blank. The punch press 11 includes a cylindrical die holder 12 bolted onto the plate or bed 13 of the punch press. The die holder 12 receives a cylindrical extrusion die 16 having a tapered top end portion 16a. The holder 12 is counterbored as at 15 to receive a larger cylindrical die 17 on top of the die 16.

A stake 18 is mounted in the bed plate 13 of the press and projects through the die 16 as shown in spaced relation from the inner walls of the die. The billet 10 can fit rather freely in the die 17 as shown in dotted lines and is inserted in the punch press on top of the stake 18. A punch 19 carried by the ram or movable head 20 of the punch press 11 is adapted to snugly fit into the die 17. The punch 19 has a concave end 19a for acting on the top of the billet 10 for extruding the billet into the die 16 and around the stake 18 to produce a headed cup-shaped blank 21. As shown in Figure 4 the blank 21 has a convex head 21a and a straight cylindrical hollow shank portion 21b. The head 21a is of substantially the same diameter desired for the finished poppet valve. The sloping portion 16a of the die 16 forms an outwardly flaring wall 21c from the shank 21b to the periphery of the head 21a.

The punch 19 has a vent passageway 19b extending from the concave end 19a thereof through a side wall of the punch so as to permit air to escape during the extruding operation. Likewise the bed plate 13 and stake 18 have passageways 13a and 18a therethrough to permit the escape of air from beneath the blank.

As shown in Figures 5 and 6 the headed cup blank 21 is next placed between a pair of hammer dies 22 and 23, known in the trade as "Bradley Hammers." These hammer dies 22 and 23 are mounted in power operated holders 24 as shown in Figure 6. The hammer dies together define an outwardly flaring mouth 25 converging to a restricted throat portion 26. The throat portion, in turn, flares outwardly as at 27 at a curvature desired for the neck of a poppet valve.

The cup blank 21 is subjected to repeated blows between the hammer dies 22 and 23 until the throat 26 thereof decks down or inwardly bows an intermediate portion 21d of the blank as best shown in Figure 6. This inwardly bowed intermediate portion is adjacent the head 21a of the blank. The blank is rotated during the hammering operation or alternately the dies are rotated around the blank so that the necked down portion 21d is circular in cross section.

The dies do not completely collapse the intermediate portion of the shank 21d of the blank since, as shown in Figure 6, the necked down portion 21d is hollow. The diameter of the hollow neck portion is regulated to conform with the desired diameter of the hole connecting the hollow head and hollow stem of the finished valve.

Alternately, the headed cup-shaped blank 21 of Figure 4, or even the necked down cup shaped blank of Figure 6 can be made in accordance with this invention by a casting operation wherein the metal is initially cast to the desired shape.

As shown in Figure 7, the necked down blank 21 is inserted between the dies 30 and 31 carried in a platen or bed plate 32 of a punch press 33. The dies 30 and 31 define a cylindrical open bottomed chamber 34 receiving the head 21a of the blank, a restricted throat portion 35 receiving the necked down or inwardly bowed portion 21d of the blank, and a cylindrical portion 36 receiving the shank portion 21b of the blank. The portions of the dies defining the throat 35 act as extrusion dies.

An annular hollow chaser 37 of inexpensive steel or other metal is mounted on top of the blank 21 in the dies 30 and 31 and extends above the dies as shown.

The punch press 33 includes a power operated head 38 carrying a plunger 39. The plunger 39 has a flat chaser engaging end 39a with a central bore 39b therethrough communicating with an axial chamber 39c in the plunger. An abutment piece 40 is mounted in the chamber 39c in spaced relation from the top end of the bore 39b. A pin 41 extends through the bore 39b into the chamber 39c and has a head 41a slidably mounted in the chamber between the abutment piece 40 and a shoulder 39d formed between the top of the bore 39b and the chamber 39c.

The pin has a straight cylindrical portion 41b projecting through the bottom of the plunger and through the chaser 37 into the shank portion 21b of the blank. A tapered end portion 41c of the pin extends from the lower end of the cylindrical portion 41b into the necked down portion 21d of the blank to snugly engage the inner wall of this necked down portion as shown.

The head 38 of the press 33 is operated to force the plunger and chaser into the dies 30 and 31 and thereby extrude the blank 21 through the throat defining portions of the dies. During this extruding operation the blank metal is compressed by the dies and forced through the restricted throat 35. The blank is thus reduced in size due to the restricted throat and the head portion of the blank 21a will move downwardly through the cylindrical portion 34 of the dies at a faster rate than the rate of movement of the plunger 39. Inasmuch as the inner wall of the blank 21 is being tightly pressed against the pin 41 the faster traveling portion of the blank 21 will pull the pin 41 with it, thereby moving the pin head 41a downwardly in the chamber 39c of the plunger. Thus the pin moves downwardly faster than the plunger at the same rate as the metal being extruded. This increased rate of travel of the pin will continue until the head 41a of the pin abuts the shoulder 39d of the plunger whereupon the pin will move at the same rate as the plunger. When this occurs the pin will start to be retracted out of the blank because the metal being extruded continues to move at the faster rate.

The tapered end 41c of the pin is sufficiently long to form a desired tapered throat portion in the valve body formed as a result of the extruding operation from the blank 21. When the head of the pin abuts the shoulder 39d of the plunger the blank and pin will have traveled through the throat-defining portion 35 of the dies a sufficient amount to form the desired tapered throat and from then on the blank metal is extruded around the straight cylindrical portion 41b of the pin. The straight cylindrical portion 41b will form a straight cylindrical hole in the stem of the resulting valve body formed from the blank.

By moving the pin with the extruding metal it is thus possible to produce a tapered hole in the valve body having the exact shape of the tapered end of the pin portion and to then center a straight hole on the same axis as the tapered portion through the remainder of the stem of the valve body. The pin can be accurately finished and polished so that the hole in the valve body will have the desired dimensions and shape.

As shown in Figure 8, at the completion of the extruding operation a valve body 42 is formed from the blank 21. This body 42 has a head 42a which is the same as the blank head 21a and has a neck portion 42b which is the same as that portion of the inwardly bowed section of the blank lying between the head and the throat-defining portion 35 of the dies 30 and 31. The valve body 42, however, has a straight cylindrical stem 42c with a tapered hole portion 42d extending through the neck 42b into the head cavity. This tapered hole provides a thickened neck 42b since the small end of the hole is adjacent the neck. The stem 42c has a straight cylindrical hole portion 42e extending from the large end of the tapered portion 42d throughout the remainder of the stem.

As shown in Figure 8, when the plunger 39 reaches the bottom of its stroke it has forced the chaser 37 through the cylindrical portion 36 of the dies and into the top half of the restricted portion 35 of the dies. This deforms the chaser and causes the same to clinch onto the upper end of the blank metal. As the top of the blank metal is forced through the throat 35 it is compressed to a size very near to the diameter of the aperture in the chaser. As soon as the diameter of the blank becomes sufficiently small so that the pressure on the chaser is greater than the resistance of the metal, the chaser will shear itself over the blank metal and the blank will extend into the aperture of the chaser. As the plunger continues in its downward stroke it compresses the chaser into the taper of the die and forces it into the upper part of the blank causing it to clinch or tightly grip onto the pin.

As the plunger moves upwardly on its reverse stroke the extruded valve body 42 and the extruded chaser 37 will be raised through the throat 35 by the pin 41, since the pin is carried upwardly with the plunger.

When the neck portion 42b of the valve body is raised into the restricted throat-defining portion of the dies, upward movement of the valve body is stopped and continued upward movement of the plunger will extract the pin 41 from the valve body and chaser.

The dies 30 and 31 are then removed from their seats and the valve body is removed therefrom. When the dies are opened up the valve body can be removed.

The end of the valve stem portion 42c extending into the extruded chaser 37 is then cut off along the dotted line 43 to produce the valve body. This valve body can be made with an oversize diameter stem and then machined down to proper diameter for providing a nubbin end 44 thereon as shown in Figure 9, or alternately can be made with an oversize length and then upset at the end to form the nubbin 44 as shown in Figure 10.

By extruding the blank metal around the pin which is mounted so as to be moved with the extruding metal, it is possible to form the hole through the valve stem with a true tapered portion and a straight cylindrical portion having the exact contour as the pin.

The nubbin 44 is then formed on an oversize diameter hollow stem by machining off stem material between the neck 42b and a point spaced from the end of the stem as indicated at M in Figure 9. This leaves a stem 42c of proper diameter with an enlarged nubbin end 44.

Alternately the nubbin can be formed on a stem 42c of the proper diameter but longer than desired. This upsetting operation can be carried out by mounting the valve body 42 between a pair of dies 45 and 46. These dies can be mounted in a bed plate or die holder (not shown) and can be held in aligned relation by means of a dowel such as 47.

The dies 45 and 46 define a cylindrical bore 48 snugly receiving the stem 42c of the valve body throughout a portion of its length. The dies 48 also define an enlarged bore 49 axially aligned with the bore 48 and having a diameter desired for the diameter of the nubbin 44. An annular seat 50 is formed between the bores 48 and 49.

A punch head 51 carries a cylindrical plunger 52 adapted to slide into the bore 49 of the dies. The plunger has a flat active end 52a for engaging the end of the stem portion 42c. A fixed pin 53 extends axially from the plunger end 52a into the hole 42e of the valve body. The pin can have a tapered end 53a for extending into the tapered hole 42d of the blank if desired.

The plunger 52 presses against the end of the stem while the dies prevent movement of the valve body until the nubbin 44 is formed to the full diameter of the bore 49. The punch is then retracted out of the bore 49 pulling the pin 53 out of the valve body, the dies are opened up, and the valve body with a nubbin end is discharged from the dies.

The valve body 42 can then be internally finished as desired, or externally machined if necessary, and is then partially filled with a coolant such as sodium or the like. The partially filled valve body is next placed between the dies 55 and 56 carried in a die holder 57 of another punch press 58. The dies can have handles 59 threaded therein to facilitate their removal from the holder 57 if desired. Similar handles could be provided for the dies of the punch presses illustrated in Figures 3, 8 and 10 if desired.

The die holder 57 is formed on a platen 57a which can be mounted on the bed of the punch press 58. The holder has a cylindrical chamber 60 adapted to receive the head of the valve body 42 and the dies define a cylindrical bore 61 snugly receiving the stem 42c of the valve body along a portion of the length thereof. The dies also define a larger diameter bore 62 to receive the nubbin end 44 of the valve stem. A nubbin collapsing seat 63 is defined by the dies between the bores 61 and 62.

The punch press has a movable head 64 carrying a cylindrical plunger 65 adapted to fit in the bore 62 and having an active end 66 for engaging the nubbin. A small projection 66a can be formed on the end 66 of the plunger to center a metal chaser ring 68 for pushing the entire length of the nubbin through the die seat 63 without deforming the plunger.

The head 64 is then moved downwardly to force the plunger against the chaser 68 and move the nubbin 44 through the collapsing seat 63 of the dies thereby inwardly collapsing the nubbin into the hole 42e of the valve body and forming a solid end 67 on the valve. This seals the coolant C in the valve.

The valve body thus has hollow stem and head cavities partially filled with coolant. The coolant is sealed by a solid closed end 67 on the stem.

As shown in Figure 12 the valve body 42 is machined to provide a finished valve 70 with a hollow head portion 71 having a valve seat periphery 72, a thickened throat portion 73 and a cylindrical stem 74 with a closed solid end 75. The closed solid end 75 can have an annular groove 76 cut therein for receiving a valve spring retainer. The head and stem cavities contain the coolant C. The tapered portion of the stem cavity makes possible the formation of the thickened throat portion without increasing the external diameter of the valve neck.

From the above description, therefore, it will be understood that the invention specifically deals with the production of hollow poppet valves by die pressing or extruding operations. The extruding operations are preferably carried out at elevated forging temperatures.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. The method of making hollow articles which comprises inserting a cylindrical pin with a tapered end portion through the open end of a closed bottom hollow blank having an inwardly bowed portion adjacent the closed bottom, aligning the tapered portion of the pin with the inwardly bowed portion of the blank, extruding the portion of the blank lying between the inwardly bowed portion and the open end of the blank against the pin while moving the pin with the extruded metal at the same rate of movement as the extruded metal for forming a tapered hole portion in the blank of identical shape as the said tapered end of the pin, continuing the extrusion of the blank metal in the same direction, moving the pin at a slower rate than the extruded metal during the continued extrusion to press the metal against the cylindrical portion of the pin for forming a cylindrical hollow portion in the blank on the same axial center as the tapered hollow portion, and removing the pin from the extruded blank.

2. The method of making hollow poppet valves from a cup-shaped metal blank having a necked-down reduced hollow portion adjacent the closed end thereof which comprises inserting a pin having a tapered leading end into the open end of the blank to position the tapered leading end of the pin in the necked-down portion, extruding the portion of the blank between the necked-down portion and the open end of the blank against the pin while moving the pin with the extruded metal of the blank at the same rate of movement as the extruded metal for forming a tapered hole portion in the blank of identical shape as the said tapered end portion of the pin, said extrusion of the blank causing the extruded metal portion of the blank to move at a faster rate than the portion of the blank following the extruded portion, and withdrawing the pin from the extruded blank.

SAMUEL H. NORTON.